No. 687,090. Patented Nov. 19, 1901.
A. WACHÉ & A. KRIÉGER.
APPARATUS OR GEAR FOR TRANSMITTING MOTION AT VARIABLE SPEED.
(Application filed Sept. 10, 1900.)
(No Model.) 5 Sheets—Sheet 1.
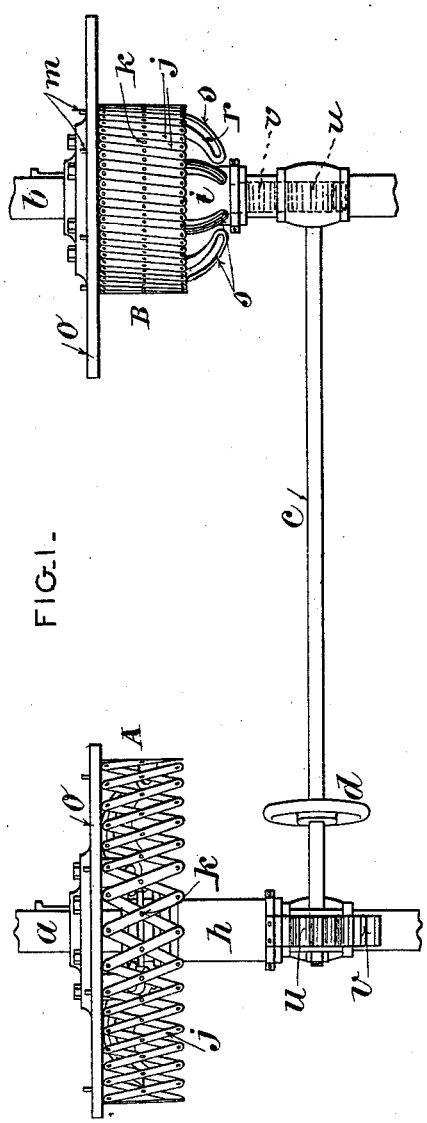
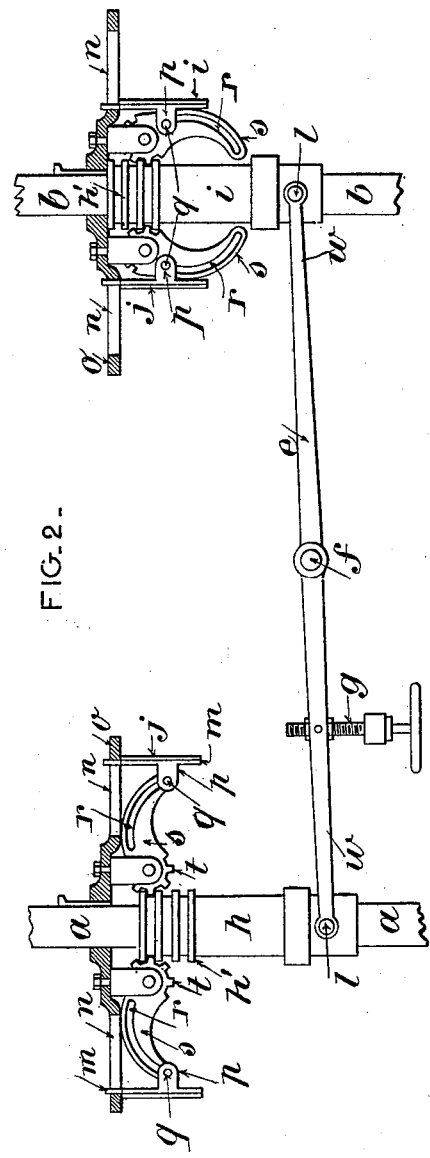

No. 687,090. Patented Nov. 19, 1901.
A. WACHÉ & A. KRIÉGER.
APPARATUS OR GEAR FOR TRANSMITTING MOTION AT VARIABLE SPEED.
(Application filed Sept. 10, 1900.)
(No Model.) 5 Sheets—Sheet 2.
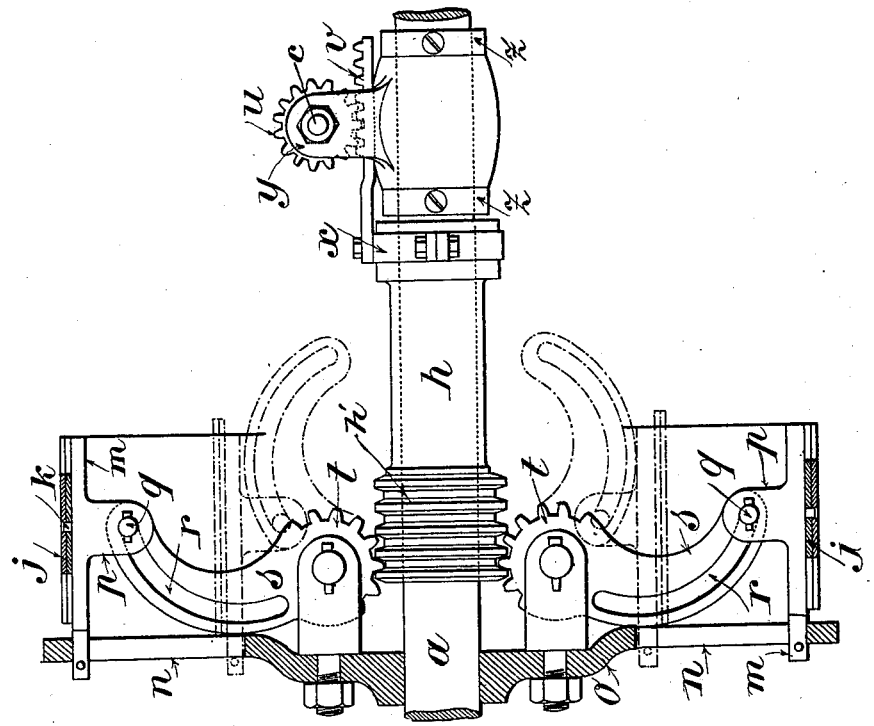
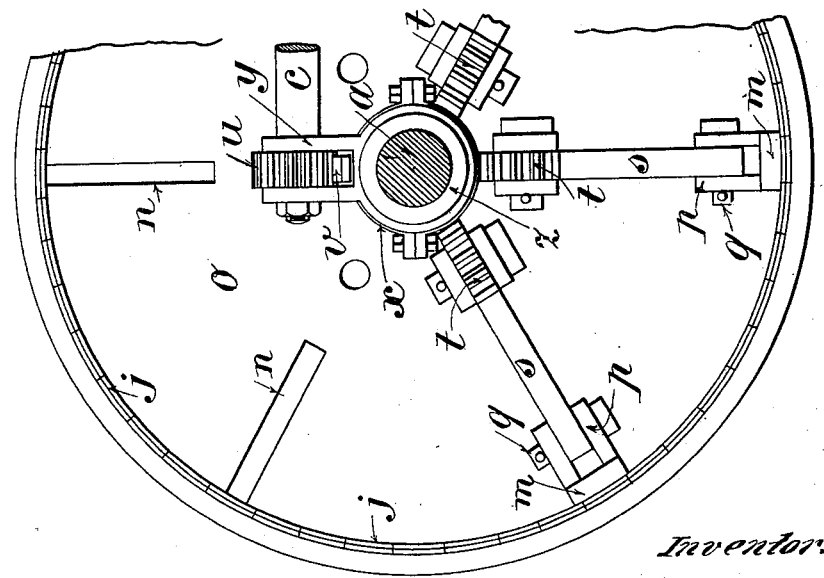
Inventors:
Armand Waché.
Alphonse Kriéger.
Witnesses:

No. 687,090. Patented Nov. 19, 1901.
A. WACHÉ & A. KRIÉGER.
APPARATUS OR GEAR FOR TRANSMITTING MOTION AT VARIABLE SPEED.
(Application filed Sept. 10, 1900.)
(No Model.) 5 Sheets—Sheet 3.
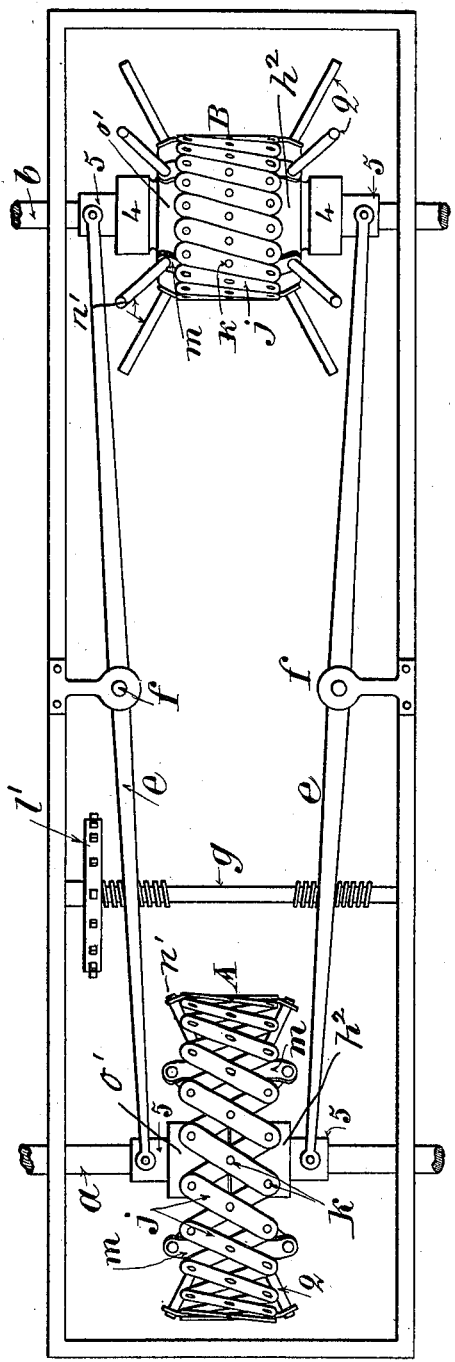
Inventors:
Armand Waché,
Alphonse Kriéger.

No. 687,090. Patented Nov. 19, 1901.
A. WACHÉ & A. KRIÉGER.
APPARATUS OR GEAR FOR TRANSMITTING MOTION AT VARIABLE SPEED.
(Application filed Sept. 10, 1900.)
(No Model.) 5 Sheets—Sheet 4.
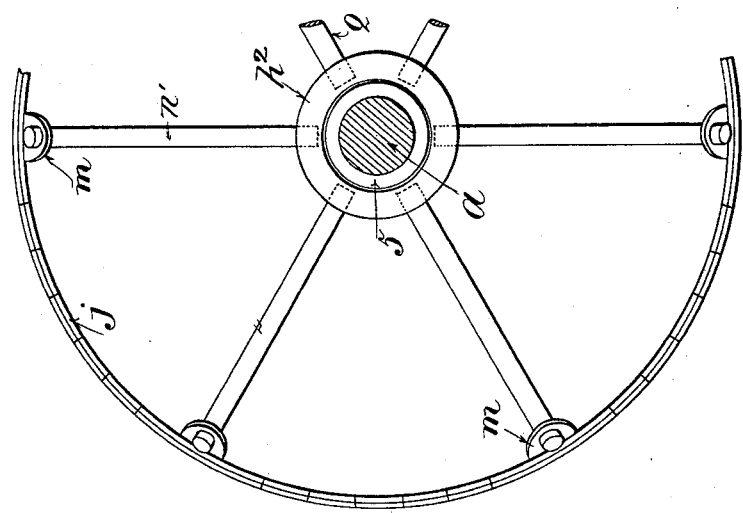
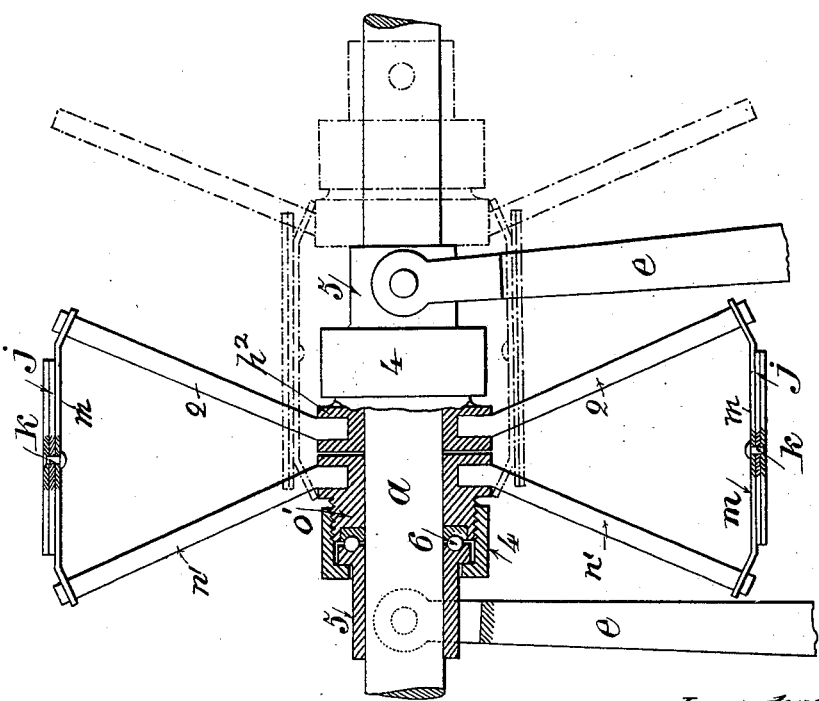

No. 687,090. Patented Nov. 19, 1901.
A. WACHÉ & A. KRIÉGER.
APPARATUS OR GEAR FOR TRANSMITTING MOTION AT VARIABLE SPEED.
(Application filed Sept. 10, 1900.)
(No Model.) 5 Sheets—Sheet 5.
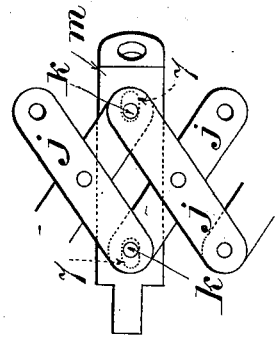
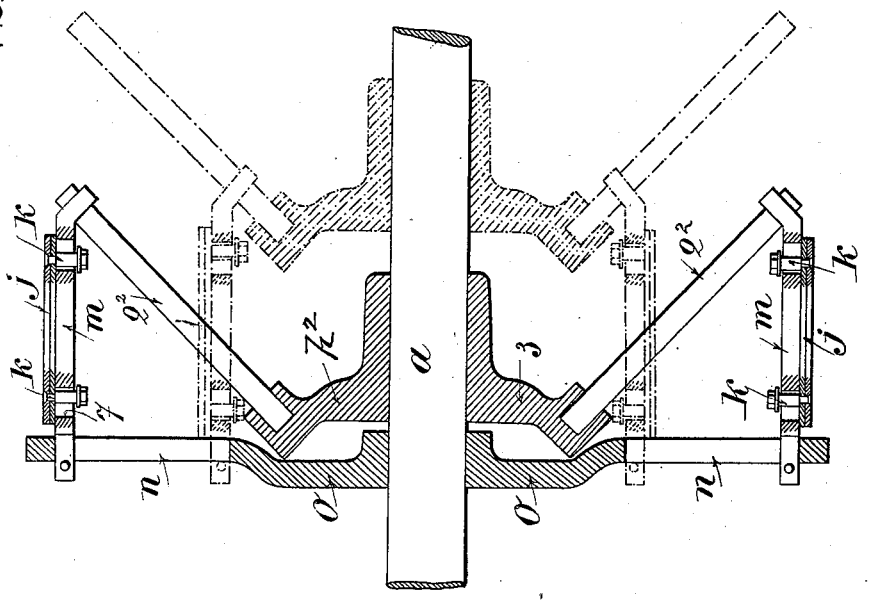
Witnesses:
Inventors:
Armand Waché.
Alphonse Kriéger.
By Munn
Attorneys.

UNITED STATES PATENT OFFICE.

ARMAND WACHÉ AND ALPHONSE KRIÉGER, OF PARIS, FRANCE.

APPARATUS OR GEAR FOR TRANSMITTING MOTION AT VARIABLE SPEED.

SPECIFICATION forming part of Letters Patent No. 687,090, dated November 19, 1901.

Application filed September 10, 1900. Serial No. 29,538. (No model.)

*To all whom it may concern:*

Be it known that we, ARMAND WACHÉ, residing at 83 Boulevard Voltaire, and ALPHONSE KRIÉGER, residing at 195 Boulevard Voltaire, Paris, in the Republic of France, engineers, citizens of the Republic of France, have invented certain new and useful Improvements in Apparatus or Gear for Transmitting Motion at Variable Speed, of which the following is a specification.

Our invention relates to an apparatus or gearing for transmitting motion, and comprises pulleys whereby the rate of transmission between a driving and a receiving shaft can be varied at will and gradually without ever modifying the tension of the transmitting-belt. The said pulleys are formed by an extensible limb or rim, the members of which are pivoted together in parallelograms and fixed from distance to distance to supports movable in a radial direction and which can be displaced at will by means of two series of inclined guides, the said series being capable of being brought nearer together or placed farther apart from each other.

The accompanying drawings show by way of example several forms by which the object of our invention can be attained.

Figure 1 shows transmitting-gearing comprising two pulleys connected together by a transversal shaft having pinions. Fig. 2 is a sectional view of similar gearing in which the pulleys are connected together by means of a lever. Fig. 3 shows the details of a pulley as seen in front view, different parts being removed. Fig. 4 is a side view of the pulley. Fig. 5 shows a modified form of the transmitting-gearing. Fig. 6 is a cross-sectional view of a pulley in the position in which its diameter is the greatest, the dotted lines showing the position of the parts when the diameter is smallest. Fig. 7 is a part elevation corresponding to Fig. 6. Fig. 8 is a cross-sectional view of a modified form of extensible pulley, and Fig. 9 is a face view of a portion of said pulley.

The apparatus or transmitting-gear shown in Figs. 1 to 4, inclusive, comprises two extensible pulleys A B, Figs. 1 and 2, fixed, respectively, on the two parallel shafts $a$ and $b$ and connected together by a transmitting-belt. (Not shown in the drawings.) The said apparatus also comprises a controlling device, such as a shaft $c$, Fig. 1, which may be revolved by means of a lever, sprocket-wheel, or fly-wheel $d$, by a lever $e$, Fig. 2, oscillating around a spindle $f$, located between the shafts $a\ b$ and operated by a screw $g$ or by any other suitable device for moving simultaneously and in opposite directions two sleeves $h\ i$, slidable on the shafts $a$ and $b$.

Each of the pulleys A B comprises, as shown in Figs. 3 and 4, an extensible limb or rim formed by small bars $j$, pivoted together in lazy-tongs fashion by means of rivets $k$. The said rim is supported by supports $m$, parallel to the shaft $a$ and which are guided at one end by radial slots $n$ in a fixed member in the form of a plate $o$, keyed to the shaft $a$. The said supports are connected to the rim by rivets or pivots $k$, located in the middle of the small bars $j$. Each of the same carries two internal ears $p$, through which passes a pin $q$. The latter is also engaged in the curvilinear slot or race $r$ in an arm $s$, pivoted to the hub of the plate $o$ in the same plane as the axis of the shaft and forming a movable member adapted to be moved toward and from the fixed member.

To obtain the radial displacement of the supports $m$ and the variations of the diameter of the rim which follow such displacement, all that need be done is to cause several arms $s$ to move on their pivots, which can be done by means of a toothed segment $l$, provided on the said arms and gearing with a fluted part $h'$ of the sleeve $h$, which constitutes a cylindrical rack free to slide on the shaft $a$.

When the sliding movement of the sleeve $h$ is obtained by means of a shaft $c$, as shown in Fig. 1, we may arrange on the said shaft a pinion $u$, meshing with a rack $v$, connected by a collar $x$ to the sleeve $h$. The said rack $v$ may be guided by a block $y$, loosely mounted on the shaft $a$ between two parts $z$, and thus serving also as a support for the shaft $c$. By placing a pinion $u$ above the shaft $a$ and another similar pinion under the shaft $b$ we are able to move simultaneously and in opposite directions the sleeves $h$ and $i$, so that one of the pulleys A or B increases in diameter when the other decreases in diameter, and vice versa.

In case a lever $e$, Fig. 2, is used to move the sleeves $h$ and $i$ the latter can be connected to the ends of the lever by means of a ring $w$, provided with trunnions $l$, as shown, or by means of a fork engaged in a groove or other known device.

In Fig. 5 the transmitting-gear comprises two extensible pulleys A and B, fixed, respectively, on the driving-shaft $a$ and the receiving-shaft $b$. A belt (not shown) passes over the said pulleys, and levers $e$ allow of moving simultaneously and in opposite directions the devices modifying the diameter of the pulleys. The said levers $e$ oscillate around a fixed spindle $f$, located at the middle of the levers, and they are controlled or operated by means of a rod $g$, having right and left hand screw-threads passing through nuts formed in each of the same. According to the direction of the rotation imparted to the screw-threaded rod $g$—by means, for example, of a chain passing over the sprocket-wheel $l'$—the levers $e$ $e$ close and open as scissors do.

In Figs. 6 and 7 is shown the form of pulley shown in Fig. 5. This pulley comprises a jointed rim formed of thin metal bars $j$, the latter being connected one to another by pivots $k$, which leave them free to move in the same manner as lazy-tongs. The said rim is supported by two series of guides $n'$ and $Q$ in the form of inclined rods secured to the collars $o'$ and $h^2$, respectively. The collars $o'$ and $h^2$ are slidably mounted on the shaft $a$, but unable to turn on the same. Each of the said rods is passed through an opening or eyelet formed in the end of the supports $m$, connected to the rim by the rivets or pivots $k$, so that when the collar $h^2$ is moved away from the collar $o'$ the supports $m$ are forced to slide along the rods and come nearer to the shaft, thus reducing the diameter of the pulley. The diameter of the latter is increased, on the contrary, when the collar $h^2$ is moved toward the collar $o'$.

It will be easily understood that in all the positions given to the levers $e$ the variations of the diameter are always proportional to the variations given to the distance which separates the collars $o'$ and $h^2$. Each of the said collars is connected by a cup 4, screwed onto its hub, to a ring 5, loosely mounted on the shaft and provided with two trunnions, on which turn the bifurcated end of one of the levers $e$.

An annular series of balls 6 can be interposed between the cup 4 and the faces of the ring 5 and hub in order to reduce wear and friction.

To brace the rods $n'$ and $Q$, we may connect them together at their ends by a hoop or continuous ring.

In another form of pulley (shown in Fig. 8) the supports $m$ of the expanding and contracting rim are guided on one side by the slots $n$ in a fixed member in the form of a plate $o$, keyed to the shaft $a$, and on the opposite side by inclined rods $Q^2$, fixed on the collar $h^2$, which is slidable on the shaft $a$ and forming, with said rods, a fixed member. The rim is connected to the supports $m$ by a certain number of rivets or pivots $k$ engaging in slideways 7, made in the said supports. The variations of the diameter of the pulley thus constructed are obtained by moving the collar $h^2$ on the shaft by means of a contracting lever $e$ of the same character as the lever $e$ shown in Fig. 2. As in the previous arrangements the variations of diameter are proportional to the displacements of the collar $h^2$, so that in two pulleys connected together and having their collars $h^2$ connected by a lever $e$ oscillating at its middle the said variations of diameter are always equal at all times for both pulleys, and they do not modify the tension of the belt.

We reserve to ourselves the right of modifying the construction and arrangement hereinbefore described and to replace the same by any equivalent arrangement based on the principles specified.

Having thus described our invention, what we claim as new, and desire to secure by Letters Patent, is—

1. An expanding pulley having two members at least one of which is movable relatively toward and from the other, supports having radial sliding movement on said members, an expanding rim carried by the supports and comprising bars pivoted together in lazy-tongs fashion, and means whereby the members are made to approach or recede from each other.

2. An expanding pulley having a fixed member, a movable member, means for moving the movable member toward and from the fixed member, supports having radial guided movement on said members as they approach and recede from each other, and an expanding rim carried by the supports and operated thereby.

3. An expanding pulley having a fixed member, movable arms, supports having sliding movement on said member and arms, an expanding rim connected with the supports, and means for operating the movable arms to cause them to move toward and from the fixed member.

4. An expanding pulley having an expanding rim provided with supports, a pulley plate or frame provided with outwardly-ranging guides engaged by said supports, a series of toothed spreading arms pivoted to said frame and having a sliding connection with the rim-supports, and a rack engaging said toothed arms and movable lengthwise of the pulley's axis.

5. An expanding pulley having an expanding rim provided with supports, a pulley plate or frame provided with outwardly-ranging guides engaged by said supports, a series of toothed spreading arms pivoted to said frame and having a sliding connection with the rim-supports, and a grooved sleeve forming a rack in engagement with said toothed arms, and movable lengthwise of the pulley's axis.

6. An expanding pulley having an expanding rim provided with supports, a fixed plate provided with radial slots, in which work one end of the supports, a series of toothed arms pivoted to the hub of the said plate and provided with curved slots in which work pins carried by the rim-supports, and a sliding sleeve provided with a fluted portion engaging the toothed arms.

7. A speed-changing mechanism, comprising two pulleys each having an expanding rim provided with supports, a pulley plate or frame provided with outwardly-ranging guides engaged by said rim-supports, a series of toothed spreading arms pivoted to said frame and having a sliding connection with the rim-supports, a grooved sleeve forming a rack in engagement with said toothed arms, and a connection between the sleeves of the two pulleys to expand one while the other is being contracted.

8. A speed-changing mechanism, comprising two pulleys each having an expanding rim provided with supports, a pulley plate or frame provided with outwardly-ranging guides engaged by said rim-supports, a series of toothed spreading arms pivoted to said frame and having a sliding connection with the rim-supports, a rack in engagement with said toothed arms, and a connection between the racks of the two pulleys, to expand one while the other is being contracted.

9. A speed-changing mechanism, comprising two pulleys each having an expanding rim provided with supports, a pulley plate or frame provided with outwardly-ranging guides engaged by said supports, a set of guides, movable lengthwise of the pulley's axis and each disposed in the same longitudinal plane with one of the first-named guides, the second set of guides being likewise engaged by the rim-supports, a sleeve movable lengthwise of the pulley's axis and operatively connected with the second set of guides, a rack secured to each sleeve, said racks being arranged on opposite sides of the sleeves in the two pulleys, and a shaft arranged adjacent to said sleeves on opposite sides thereof and having pinions in engagement with said racks.

In testimony that we claim the foregoing as our invention we have signed our names in presence of two subscribing witnesses.

ARMAND WACHÉ.
ALPHONSE KRIÉGER.

Witnesses:
CAMILLE BLÉTRY,
EUGÈNE WATTIER.